United States Patent
Sukhwani et al.

(10) Patent No.: US 12,287,829 B2
(45) Date of Patent: Apr. 29, 2025

(54) MINIMIZING HASH COLLISIONS OF COMPOSITE KEYS

(71) Applicant: International Business Machines Corporation, Armonk, NY (US)

(72) Inventors: Bharat Sukhwani, Sudbury, MA (US); Sameh Asaad, Briarcliff Manor, NY (US); Mohit Kapur, Westchester, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/113,182

(22) Filed: Feb. 23, 2023

(65) Prior Publication Data

US 2024/0289383 A1 Aug. 29, 2024

(51) Int. Cl.
*G06F 16/901* (2019.01)
(52) U.S. Cl.
CPC ................ *G06F 16/9014* (2019.01)
(58) Field of Classification Search
CPC .............. G06F 16/9014; H04L 45/7453
See application file for complete search history.

(56) References Cited

U.S. PATENT DOCUMENTS

| | | | |
|---|---|---|---|
| 8,762,399 B2 | 6/2014 | Calvignac et al. | |
| 9,317,548 B2 | 4/2016 | Attaluri et al. | |
| 10,742,596 B2 | 8/2020 | Mosko | |
| 2011/0320704 A1* | 12/2011 | Bhattacharya | G11C 15/00 711/108 |
| 2014/0101129 A1* | 4/2014 | Branish, II | G06F 16/972 707/E17.054 |
| 2014/0214855 A1* | 7/2014 | Attaluri | G06F 16/2255 707/747 |
| 2014/0280375 A1* | 9/2014 | Rawson | G06F 16/21 707/803 |

(Continued)

FOREIGN PATENT DOCUMENTS

| | | |
|---|---|---|
| CN | 103577564 A | 2/2014 |
| CN | 105224620 A | 1/2016 |

(Continued)

*Primary Examiner* — Ann J Lo
*Assistant Examiner* — Fatima P Mina
(74) *Attorney, Agent, or Firm* — Shackelford, McKinley & Norton, LLP; Robert A. Voigt, Jr.

(57) ABSTRACT

A computer-implemented method, system and computer program product for minimizing hash collisions of composite keys. Each component ("key component") of the composite key is converted into a linear index that uniquely represents that key component. Such a one-to-one mapping reduces the length (i.e., range of values the key component represents) of each component without introducing any collisions thereby effectively resulting in the lossless compression of the individual key components. Such a linear index for each converted key component is stored in a separate lookup memory. A reduced composite key is then created by joining together the linear indices that represent the components of the composite key thereby reducing the total length or domain (i.e., range of values the composite key represents) of the original composite key in a lossless manner. In this manner, by reducing the total length of the composite key, hash collisions of composite keys are minimized.

20 Claims, 5 Drawing Sheets

(56) References Cited

U.S. PATENT DOCUMENTS

2019/0179933 A1\* 6/2019 Wang ................. G06F 16/2272
2020/0201821 A1\* 6/2020 Wang ..................... G06F 16/13

FOREIGN PATENT DOCUMENTS

| CN | 106528670 A | 3/2017 |
| CN | 106708438 A | 5/2017 |
| KR | 20170122481 A | 11/2017 |
| WO | WO-2020125741 A1 \* | 6/2020 |

\* cited by examiner

MINIMIZING HASH COLLISIONS OF COMPOSITE KEYS

TECHNICAL FIELD

The present disclosure relates generally to hash collisions, and more particularly to minimizing hash collisions of composite keys by leveraging domain knowledge.

BACKGROUND

Hashing is the process of converting a given key into another value (a new value). A hash function is used to generate the new value according to a mathematical algorithm. The result of the hash function is known as a hash value or simply, a hash.

SUMMARY

In one embodiment of the present disclosure, a computer-implemented method for minimizing hash collisions of composite keys comprises converting each key component of a composite key into a linear index that represents the key component, where the composite key comprises two or more attributes that together uniquely identify an entity occurrence. The method further comprises storing the linear index for each converted key component in a separate lookup memory. The method additionally comprises creating a reduced composite key by joining together the linear index for each converted key component.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
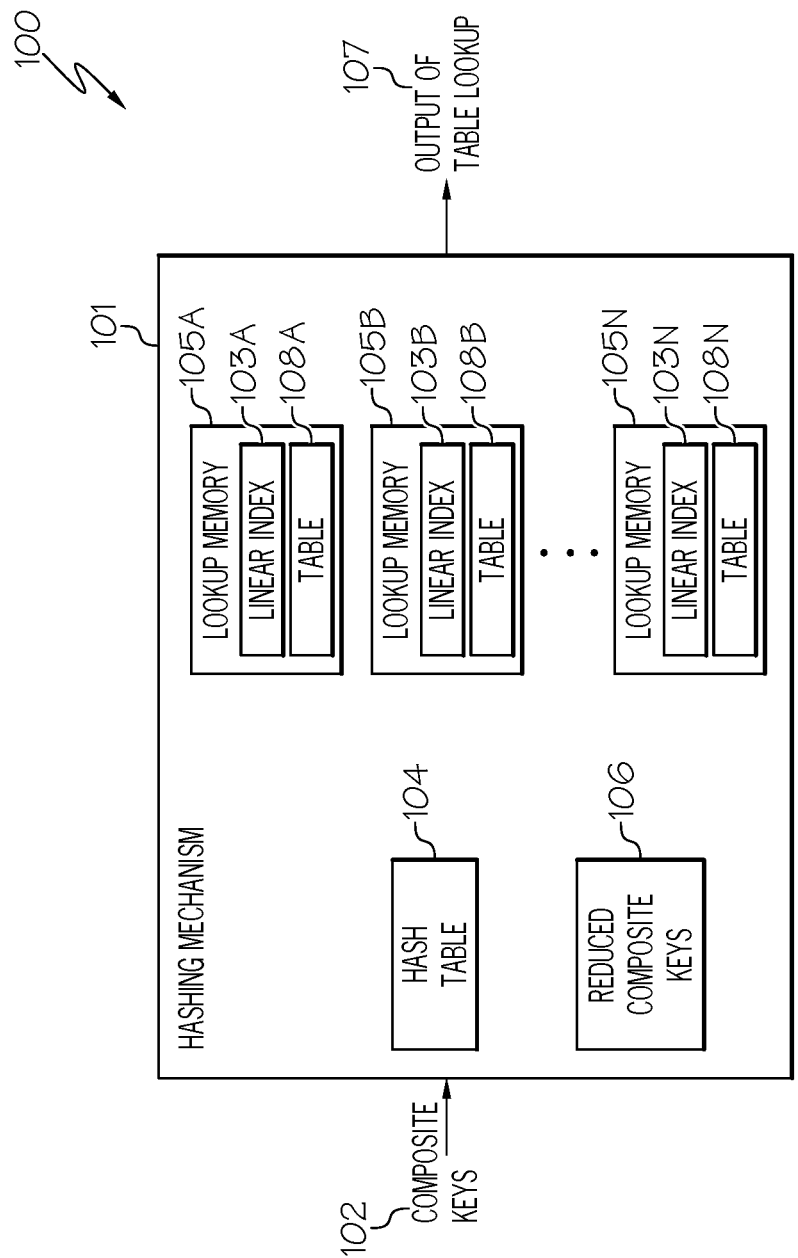
FIG. 1 illustrates a communication system for practicing the principles of the present disclosure in accordance with an embodiment of the present disclosure.

As stated above, hashing is the process of converting a given key into another value (a new value). A hash function is used to generate the new value according to a mathematical algorithm. The result of the hash function is known as a hash value or simply, a hash.

Hashing is most commonly used to implement hash tables. A hash table stores key/value pairs in the form of a list where any element can be accessed using the key. Since the keys can be of arbitrary size and cannot be used directly as an address for the table, a hash function can be used to map the keys to the size of the table, where the hash value becomes the index for a given element.

Hash functions and their associated hash tables are used in data storage and retrieval applications to access data in a small and nearly constant time (executed in an amount of time independent of the input size) per retrieval. A hash function takes a key as an input, which is associated with a datum or record, and used to identify the datum or record to the data storage and retrieval application. The keys may be fixed length, such as an integer, or variable length, such as a name. The keys may also be what is referred to as "composite keys," which include two or more attributes (e.g., independent fields of a tuple) that together uniquely identify an entity occurrence. As discussed above, the output of the hash function is a hash value used to index a hash table (data structure that implements an associative array or dictionary that maps keys to values) holding the data or records or pointers to them. Such a hash value may correspond to the memory address or memory location where the data or record is stored in the hash table.

For example, a composite key may correspond to a user datagram protocol (UDP)/transmission control protocol (TCP) tuple comprised of 5 fields that is hashed by a hash function to generate a hash value that is used to uniquely identify a value, such as an identification of a UDP/TCP session, in a hash table.

Unfortunately, hash collisions may occur when hashing from a wide domain of lookup keys, such as composite keys, to a small range (set of memory addresses) which can result in many keys generating the same hash value which identifies the same location in the hash table. A hash collision is when two pieces of data (e.g., different UDP/TCP sessions) generate the same hash value under a given hash function.

When a hash collision occurs, it is handled using various techniques, such as hashing the key using another hash function, using multiple entries per locations of the hash table, maintaining a linked-list of keys hashing to the same value, etc. These techniques, however, result in increased lookup times.

Unfortunately, there is not currently a means for effectively minimizing hash collisions of composite keys.

The embodiments of the present disclosure provide a means for minimizing hash collisions of composite keys by leveraging domain knowledge. A "domain," as used herein, refers to the range of values, such as the range of values of the components of the composite key. "Doman knowledge," as used herein, refers to the knowledge of the domain, field or application space where hashing is being employed. A "composite key," as used herein, refers to two or more attributes (e.g., independent fields of a tuple) that together uniquely identify an entity occurrence (e.g., UDP/TCP session). In one embodiment, each component (referred to herein as the "key component") of the composite key is converted into a linear index that represents the key component. The "linear index," as used herein, corresponds to an n-bit integer value, where "n" is different for the different components of the composite key based on the number of unique values that component can represent. For example, if the key component corresponds to the attribute of an IP address, then such IP addresses would be mapped to a set of linear indices of a certain width. For instance, the IP address of 9.2.2.8 would be mapped to 1, the IP address of 9.4.5.6 would be mapped to 2 and so forth. The width of the linear index represents the range of values for the attribute represented by the associated key component. That is, the width of the linear index corresponds to the number of bits required to store the number of unique values (obtained from the domain knowledge) for that key component (e.g., field of the composite key) which is smaller than the field size of the component of the composite key. For example, if the key component has the attribute of an IP address, and there are only 6 possible values for the IP address, then the width of the linear index is 3 bits. As a result, the length (i.e., range of values the component of the composite key represents) of the key component of the composite key is reduced without introducing any collisions thereby effectively resulting in a lossless compression of the individual key components. A reduced composite key is then created by joining together the linear indices for each converted key component thereby reducing the total length (i.e., range of values the composite key represents) of the original composite key in a lossless manner. In this manner, by reducing the total length or domain of the composite key, hash collisions of composite keys are minimized. The hash value of the original composite key is computed by hashing the reduced composite key using a hashing algorithm, where the hash value is used to perform a table look-up in a hash table to identify a value in the hash table (e.g., flow tuple). A further discussion regarding these and other features is provided below.

In some embodiments of the present disclosure, the present disclosure comprises a computer-implemented method, system and computer program product for minimizing hash collisions of composite keys. In one embodiment of the present disclosure, each component ("key component") of the composite key is converted into a linear index that uniquely represents that key component. A "composite key," as used herein, is a key that includes two or more attributes (e.g., independent fields of a tuple) that together uniquely identify an entity occurrence. A "linear index," as used herein, corresponds to an n-bit integer value, where "n" is different for the different components of the composite key based on the number of unique values that component can represent. For example, if the key component corresponds to the attribute of an IP address, then such IP addresses would be mapped to a set of linear indices of a certain width. For instance, the IP address of 9.2.2.8 would be mapped to 1, the IP address of 9.4.5.6 would be mapped to 2 and so forth. In one embodiment, such mappings (key component to linear index mappings) are stored in a data structure, such as a table. The width of the linear index represents the range of values for the attribute represented by the associated key component. That is, the width of the linear index corresponds to the number of bits required to store the number of unique values (obtained from the domain knowledge) for that key component (e.g., field of the composite key) which is smaller than the field size of the component of the composite key. As a result, the length (i.e., range of values the component of the composite key represents) of the key component of the composite key is reduced without introducing any collisions thereby effectively resulting in a lossless compression of the individual key components. In one embodiment, the linear index, including the data structure (e.g., table) storing the mappings between the key component values and the assigned linear index integer values, are stored in a separate lookup memory (e.g., constant-time lookup memory). A reduced composite key is then created by joining together the linear indices that represent the components of the composite key thereby reducing the total length or domain (i.e., range of values the composite key represents) of the original composite key in a lossless manner. In this manner, by reducing the total length or domain of the composite key, hash collisions of composite keys are minimized.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a hashing mechanism 101 configured to minimize hash collisions of composite keys 102 inputted to hashing mechanism 101. Composite keys 102 may collectively or individually be referred to as composite keys 102 or composite key 102, respectively.

In one embodiment, hashing mechanism 101 minimizes the hash collisions of composite keys 102 by converting each component ("key component") of composite keys 102 into a linear index 103A-103N, where N is a positive integer number, that represents the key component. Linear indices 103A-103N may collectively or individually be referred to as linear indices 103 or linear index 103. "Linear index 103," as used herein, corresponds to an n-bit integer value, where "n" is different for the different components of the composite key based on the number of unique values that component can represent. For example, if the key component corresponds to the attribute of an IP address, then such IP addresses would be mapped to a set of linear indices of a certain width. For instance, the IP address of 9.2.2.8 would be mapped to 1, the IP address of 9.4.5.6 would be mapped to 2 and so forth. In one embodiment, such mappings (key component to linear index mappings) are stored in a data structure (e.g., table). The width of the linear index represents the range of values for the attribute represented by the associated key component. That is, the width of the linear index corresponds to the number of bits required to store the number of unique values (obtained from the domain knowledge) for that key component (e.g., field of the composite key) which is smaller than the field size of the component of the composite key. As a result, the length (i.e., range of values the component of the composite key represents) of the key component of the composite key is reduced without introducing any collisions thereby effectively resulting in a lossless compression of the individual key components. Due to the fact that the individual components of composite key 102 are sparsely populated (i.e., the range of values represented by such components is much smaller than what can be represented by that component), each component (key component) can be represented by a small index 103, which when taken in combination, results in a reduction in the size of composite key 102 prior to hashing. By converting each key component of composite key 102 into a liner index 103, the length (i.e., range of values the key component represents) of the key component is reduced without introducing any collisions which effectively results in the lossless compressions of the individual key components. As a result, a lossless reduction in the size of composite key 102 may be implemented.

Furthermore, as shown in FIG. 1, hashing mechanism 101 includes a hash table 104. "Hash table 104," as used herein, refers to a data structure that implements an associative array or dictionary that maps keys to values.

Additionally, as shown in FIG. 1, in one embodiment, each linear index 103A-103N for each converted key component is stored in a separate lookup memory (e.g., constant-time lookup memory) 105A-105N, where N is a positive integer number. Furthermore, each table 108A-108N, where N is a positive integer number, storing the mappings between the key component values and the assigned linear index integer values for such a linear index 103, is stored in a separate lookup memory (e.g., constant-time lookup memory) 105A-105N, respectively. Tables 108A-108N may collectively or individually be referred to as tables 108 or table 108, respectively. Lookup memories 105A-105N may collectively or individually be referred to as lookup memories 105 or lookup memory 105, respectively. In one embodiment, lookup memory 105 is a constant-time lookup memory, where "constant-time," as used herein, refers to executing the lookup operation in an amount of time independent of the input size. In one embodiment, lookup memory 105 is a content addressable memory.

In one embodiment, hashing mechanism 101 creates a reduced composite key 106 by joining together the linear indices 103 for each converted key component thereby reducing the total length (i.e., range of values the composite key represents) of the original composite key 102 in a lossless manner.

In one embodiment, the hash value of the original composite key 102 is computed by hashing reduced composite key 106 by hashing mechanism 101, where the hash value is used to perform a table look-up in hash table 104 to identify a value 107 (e.g., IPv4 address) in hash table 104.

A description of the software components of hashing mechanism 101 used for minimizing hash collisions of composite keys 102 is provided below in connection with FIG. 2. A description of the hardware configuration of hashing mechanism 101 is provided further below in connection with FIG. 5.

In one embodiment, hash table 104 and lookup memories 105 are stored in a storage device (e.g., memory) of hashing mechanism 101.

Figure 2:
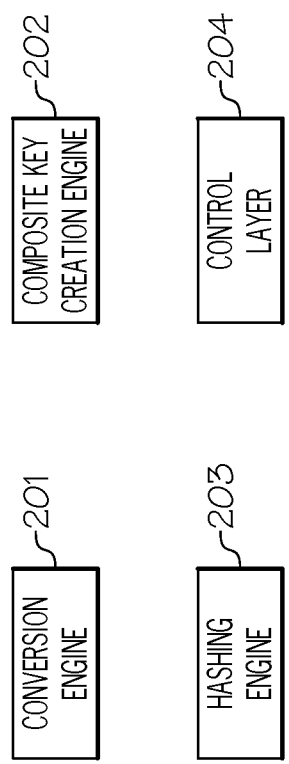
FIG. 2 is a diagram of the software components used by the hashing mechanism for minimizing hash collisions of the composite keys in accordance with an embodiment of the present disclosure.

Referring now to FIG. 2, in conjunction with FIG. 1, FIG. 2 is a diagram of the software components used by hashing mechanism 101 for minimizing hash collisions of composite keys 102 in accordance with an embodiment of the present disclosure.

As shown in FIG. 2, hashing mechanism 101 includes a conversion engine 201 configured to convert each component ("key component") of composite keys 102 into a linear index 103 that uniquely represents that key component.

In one embodiment, each key component represents an attribute (e.g., independent field of a tuple) of the composite key. In one embodiment, linear index 103 corresponds to an n-bit integer value, where "n" is different for the different components of the composite key based on the number of unique values that component can represent. For example, if the key component corresponds to the attribute of an IP address, then such IP addresses would be mapped to a set of linear indices of a certain width. For instance, the IP address of 9.2.2.8 would be mapped to 1, the IP address of 9.4.5.6 would be mapped to 2 and so forth. In one embodiment, such mappings (key component to linear index mappings) are stored in a data structure (e.g., table 108). The width of the linear index represents the range of values for the attribute represented by the associated key component. In one embodiment, the range of values for such an attribute may be determined by conversion engine 201 by identifying the number of possible unique values for such an attribute. In one embodiment, such a range of values may be obtained by conversion engine 201 from the domain knowledge, such as via the description of the session. In another embodiment, the range of values may be provided by the domain or workload expert. As a result, the width of linear index 103 corresponds to the number of bits required to store the number of unique values (obtained from the domain knowledge) for that key component (e.g., field of composite key 102) which is smaller than the field size of the component of composite key 102. As a result, the length (i.e., range of values the component of composite key 102 represents) of the key component of composite key 102 is reduced without introducing any collisions thereby effectively resulting in a lossless compression of the individual key components.

Furthermore, in one embodiment, conversion engine 201 stores linear index 103, including the data structure (e.g., table 108) storing the mappings between the key component values and the assigned linear index integer numbers, for each converted key component in a separate lookup memory 105 (e.g., constant-time lookup memory). As stated above, in one embodiment, lookup memory 105 is a constant-time lookup memory, where "constant-time," as used herein, refers to executing the lookup operation in an amount of time independent of the input size. In one embodiment, lookup memory 105 is a content addressable memory.

Figure 3:
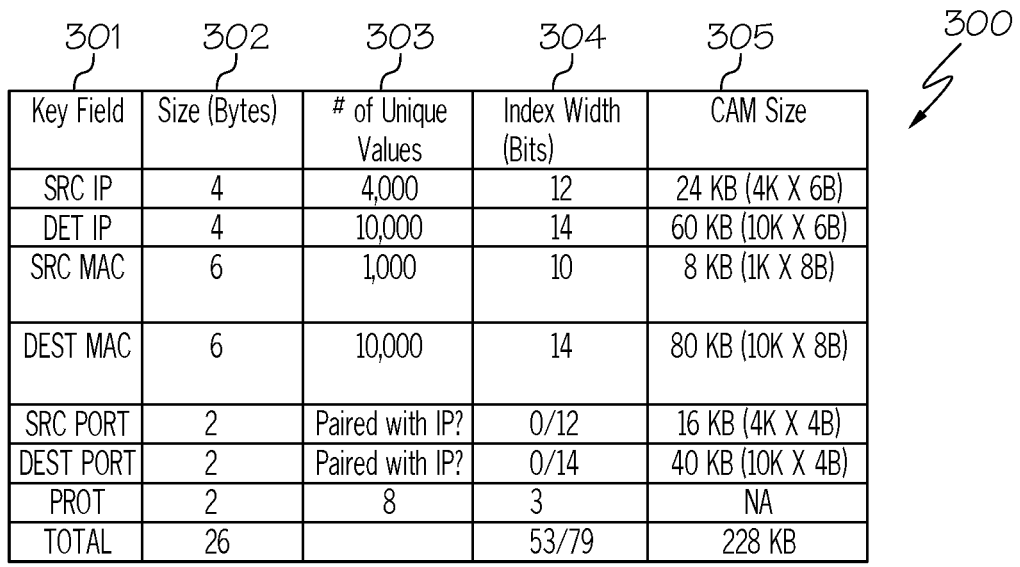
FIG. 3 is a table illustrating the size of the reduced key components and the sizes of the separate memories storing the component-to-linear index mapping table for each field of a 7-tuple composite key in accordance with an embodiment of the present disclosure.

An example of the sizes of different components of a composite key and the size in bits of the corresponding linear index is provided in FIG. 3. Referring to FIG. 3, FIG. 3 is a table 300 illustrating the size of the reduced key components and the sizes of the separate memories 105 storing the component-to-linear index mapping table 108 for each field of a 7-tuple composite key 102 in accordance with an embodiment of the present disclosure. It is noted that FIG. 3 is used for illustrative purposes and that the principles of the present disclosure are not to be limited in scope to such a depiction.

As shown in FIG. 3, composite key 102 consists of 7 key components, where each key component corresponds to a field of a 7-tuple. A "tuple," as used herein, is a finite ordered list of elements.

For example, such fields (shown in column 301 identified by "key fields") include the source Internet Protocol (IP)

address ("SRC IP"), the destination IP address ("DEST IP"), the source Media Access Control (MAC) address ("SRC MAC"), the destination MAC address ("DEST MAC"), the source port ("SRC PORT"), which is the TCP or UDP number used by a program to send data to another program on one end, the destination port ("DEST PORT"), which is the TCP or UDP number used by a program on one side of the communication to receive data from another program on the other end, and the protocol ("PROT").

The size of each field (shown in column 301) of composite key 102 is shown in column 302 of table 300. As shown in FIG. 3, the total length or size of all the fields (shown in column 301) of composite key 102 corresponds to 26 bytes as shown in column 302.

The number of unique values for each of these fields (shown in column 301) in the original composite key 102 is shown in column 303 of table 300. In one embodiment, such values are obtained by conversion engine 201 based on domain knowledge, such as via the description of the session or the size of the network deployment. In another embodiment, the range of values may be provided by the domain or workload expert.

With respect to the SRC PORT and DEST PORT fields, such unique values may be paired with the Internet Protocol (IP) (illustrated by the phrase "Paired with IP?").

As discussed above, conversion engine 201 converts each component ("key component") of composite key 102 into a linear index 103 that uniquely represents that key component. For example, conversion engine 201 converts each key component (i.e., each field) of composite key 102 into linear index 103. Table 300 includes a column 304 for indicating the width of each of these linear indices 103 (i.e., the range of values the key component represents for that field) in terms of the number of bits. For example, as shown in table 300, the number of bits corresponding to the width of linear index 103 representing the key field of SRC IP is 12 bits since there are 4,000 unique values for that field. It is noted that for SRC PORT and DEST PORT, the number of bits may be 0 or 12/14, respectively, depending on whether or not the number of unique values is paired with the IP. As shown in FIG. 3, the width of such linear indices 103 for all the key components of composite key 102 is 53 bits if the number of bits of SRC PORT and DEST PORT is 0 and 79 bits if the number of bits of SRC PORT and DEST PORT are 12 and 14, respectively. Hence, the scheme of the present disclosure reduces the length of the 7-tuple composite key 102 from 26 bytes to 10 bytes (80 bits). In this example, such a reduction can be achieved using a few hundred kilobytes (KB) of memory resources (e.g., lookup memories 105, such as content addressable memories) as discussed below. By reducing the length of composite key 102, hash collisions are reduced. Furthermore, by reducing the length of composite key 102, fewer computational resources are needed for hashing.

Referring again to FIG. 3, table 300 includes a column 305 indicating the amount of memory resources utilized by lookup memories 105, such as content addressable memories (CAMs), to store such indices 103 and component-to-linear index mapping tables 108. In particular, column 305 indicates the memory size of lookup memory 105 (e.g., CAM) storing linear index 103 and table 108 for each converted key component (i.e., for each field of the original composite key). As shown in FIG. 3, the total amount of memory resources utilized by lookup memories 105 to store such linear indices 103 and tables 108 is 228 KB.

Referring again to FIG. 2, hashing mechanism 101 further includes a composite key creation engine 202 configured to create reduced composite key 106 by joining together the linear indices 103 that represent the components of the composite key thereby reducing the total length or domain (i.e., range of values the composite key represents) of the original composite key in a lossless manner.

In one embodiment, such linear indices 103 (smaller than the field size of the components of the composite key) are joined to form reduced composite key 106 by concatenating linear indices 103.

Hashing mechanism 101 further includes a hashing engine 203 configured to compute a hash value of the original composite key (e.g., composite key 102) by hashing reduced composite key 106 using a hashing algorithm.

In one embodiment, hashing engine 203 utilizes standard hashing techniques, such as Secure Hash Algorithm 2 (SHA-2) or MD5, to hash reduced composite key 106.

Upon computing the hash value, hashing engine 203 is configured to perform a table look-up of hash table 104 using the hash value.

Hashing mechanism 101 additionally includes a control layer 204 configured to combine correlated components or fields of composite key 102 into a fused index mapped into a single lookup memory for a further reduction in the length of composite key 102 as discussed below in connection with FIGS. 3 and 4. Such correlated components or fields are identified by control layer 204 based on the domain knowledge, such as via the description of the session or identified by the domain experts. For instance, control layer 204 is configured to combine multiple fields of composite key 102 as a single index, which is stored in a single lookup memory 105.

Figure 4:
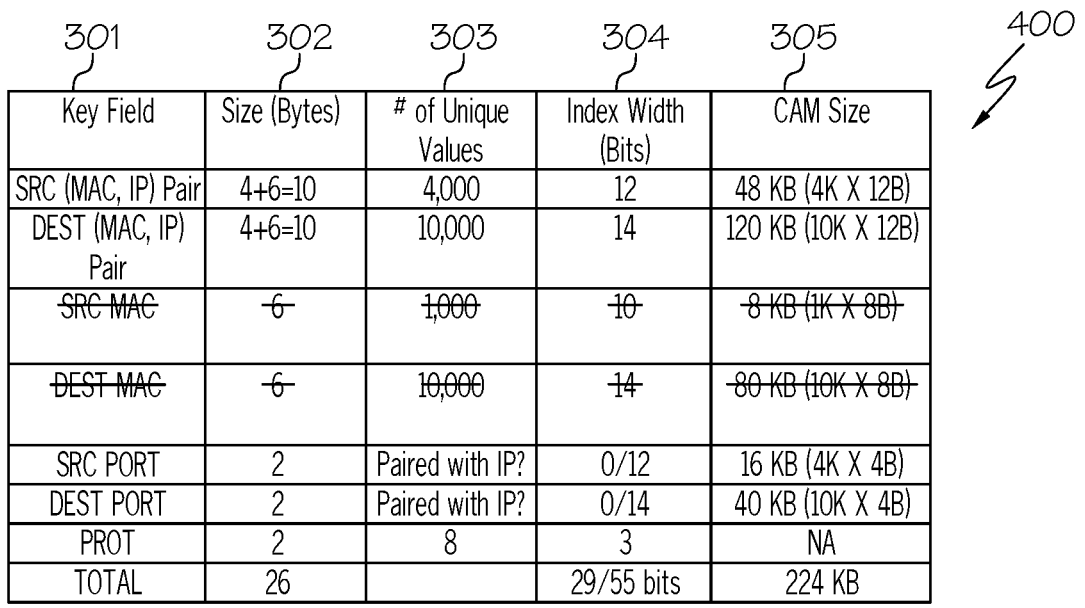
FIG. 4 is a table illustrating the combining or fusing of multiple fields of the composite key in accordance with an embodiment of the present disclosure.

FIG. 4 is a table 400 illustrating the combining or fusing of multiple fields of composite key 102 in accordance with an embodiment of the present disclosure. It is noted that FIG. 4 is used for illustrative purposes and that the principles of the present disclosure are not to be limited in scope to such a depiction.

Referring to FIG. 4, in conjunction with FIG. 3, as shown in the example of FIG. 4, fields (see column 301) of the 7-tuple composite key 102, such as SRC IP and SRC MAC, are correlated (i.e., have a mutual connection). In one embodiment, such fields may be deemed to be correlated by control layer 204 based on the domain knowledge, such as via the description of the session. In another embodiment, such fields may be identified to be correlated by the domain experts. As a result, such fields of the 7-tuple composite key 102 may be combined and represented as a single index. For instance, as shown in FIG. 4, such fields are combined as shown in column 301 (SRC (MAC, IP) pair), where the field size would be 10 bytes in the composite key (see column 302) but is combined to be represented as a single index with an index width of 12 bits (see column 304) since there are 4,000 unique values for that combined field to further reduce the length of composite key 102. Such a combination is illustrated in table 400 by the removal of the row involving the field SRC MAC.

Similarly, as shown in FIG. 4, fields DEST MAC and DEST IP are combined as shown in column 301 (DEST (MAC, IP) pair), where the size would be 10 bytes in the composite key (see column 302) but is combined to be represented as a single index with an index width of 14 bits (see column 304) since there are 10,000 unique values for that combined field to further reduce the length of composite key 102. Such a combination is illustrated in table 400 by the removal of the row involving field DEST MAC.

In one embodiment, control layer 204 combines such fields in a pairwise manner. In this manner, the number of unique values remains the same as shown in column 303 of FIGS. 3 and 4 as well as enables the index width to remain the same as shown in column 304 of FIGS. 3 and 4.

As a result of combining the SRC IP and SRC MAC fields, the memory size or the amount of memory resources utilized by lookup memories 105, such as content addressable memories (CAMs), to store such an index 103 and associated table 108 (component-to-linear index mapping table) is increased as shown in column 305. For example, by combining the SRC IP and SRC MAC fields, the CAM size for storing this single linear index 103 and associated table 108 (component-to-linear index mapping table) is increased from 24 KB to 48 KB as shown in FIGS. 3 and 4. However, by removing the SRC MAC field, there is a reduction of 8 KB in the lookup memory size as shown in table 400.

Furthermore, as a result of combining the DEST IP and DEST MAC fields, the memory size or the amount of memory resources utilized by lookup memories 105, such as content addressable memories (CAMs), to store such an index 103 and associated table 108 (component-to-linear index mapping table) is increased as shown in column 305. For example, by combining the DEST IP and DEST MAC fields, the CAM size is increased from 60 KB to 120 KB as shown in FIGS. 3 and 4. However, by removing the DEST MAC field, there is a reduction of 80 KB in the lookup memory size as shown in table 400.

As a result of combining the fields discussed above, the total amount of memory resources utilized by lookup memories 105 to store such linear indices 103 and associated tables 108 is 224 KB as shown in table 400.

Furthermore, as shown in FIG. 4, by fusing multiple fields of composite key 102 into a single index, the width of linear indices 103 is 29 bits if the number of bits of SRC PORT and DEST PORT is 0 and 55 bits if the number of bits of SRC PORT and DEST PORT are 12 and 14, respectively. Hence, the scheme of the present disclosure further reduces the length of the 7-tuple composite key 102 from 26 bytes to 7 bytes (56 bits) as opposed to reducing the length of the 7-tuple composite key 102 from 26 bytes to 10 bytes (80 bits). By reducing the length of composite key 102, hash collisions are reduced. Furthermore, by reducing the length of composite key 102, fewer computational resources are needed for hashing. Hence, the scheme of the present disclosure enables the trade-off between the use of slightly more memory resources in exchange for obtaining a reduction in hash collisions and a reduction in the computational time and resources for computing the hash value.

A further description of these and other features is provided below in connection with the discussion of the method for minimizing hash collisions involving composite keys.

Prior to the discussion of the method for minimizing hash collisions involving composite keys, a description of the hardware configuration of hashing mechanism 101 (FIG. 1) is provided below in connection with FIG. 5.

Figure 5:
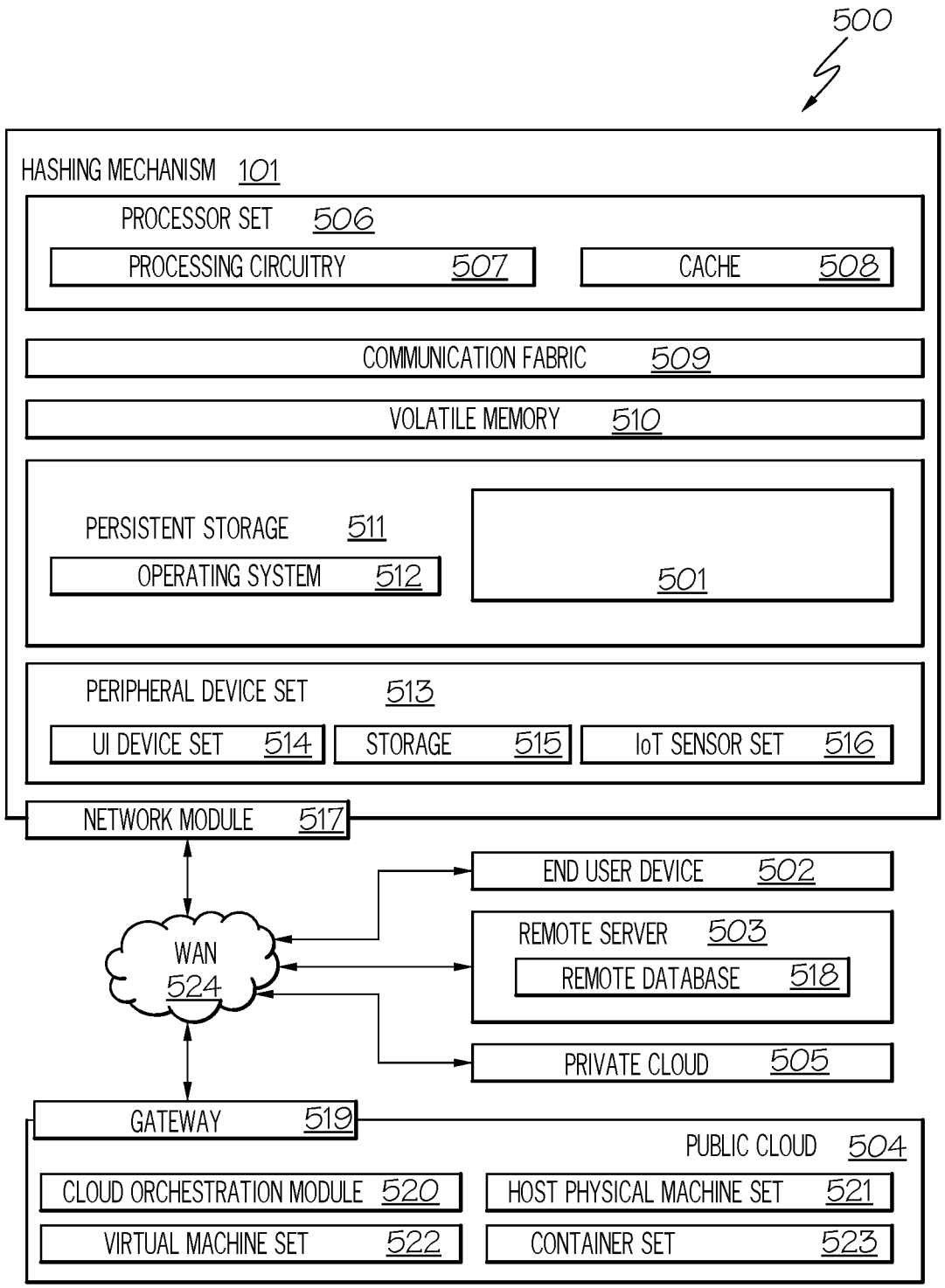
FIG. 5 illustrates an embodiment of the present disclosure of the hardware configuration of the hashing mechanism which is representative of a hardware environment for practicing the present disclosure.

Referring now to FIG. 5, in conjunction with FIG. 1, FIG. 5 illustrates an embodiment of the present disclosure of the hardware configuration of hashing mechanism 101 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code (stored in block 501) involved in performing the disclosed methods, such as minimizing hash collisions involving composite keys. In addition to block 501, computing environment 500 includes, for example, hashing mechanism 101, network 524, such as a wide area network (WAN), end user device (EUD) 502, remote server 503, public cloud 504, and private cloud 505. In this embodiment, hashing mechanism 101 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IoT) sensor set 516), and network module 517. In one embodiment, hash table 104, lookup memories 105 and reduced composite keys 106 are stored in a storage device (e.g., storage device 511, 515) of hashing mechanism 101. Remote server 503 includes remote database 518. Public cloud 504 includes gateway 519, cloud orchestration module 520, host physical machine set 521, virtual machine set 522, and container set 523.

Hashing mechanism 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically hashing mechanism 101, to keep the presentation as simple as possible. Hashing mechanism 101 may be located in a cloud, even though it is not shown in a cloud in FIG. 5. On the other hand, hashing mechanism 101 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto hashing mechanism 101 to cause a series of operational steps to be performed by processor set 506 of hashing mechanism 101 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 508 and the other storage media discussed below. The program instructions, and associated data, are accessed by processor set 506 to control and direct performance of the disclosed methods. In computing environment 500, at least some of the instructions for performing the disclosed methods may be stored in block 501 in persistent storage 511.

Communication fabric 509 is the signal conduction paths that allow the various components of hashing mechanism 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In hashing mechanism 101, the volatile memory 510 is located in a single package and is internal to hashing mechanism 101, but, alternatively or additionally, the volatile memory may be distributed over multiple packages and/or located externally with respect to hashing mechanism 101.

Persistent Storage 511 is any form of non-volatile storage for computers that is now known or to be developed in the future. The non-volatility of this storage means that the stored data is maintained regardless of whether power is being supplied to hashing mechanism 101 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid state storage devices. Operating system 512 may take several forms, such as various known proprietary operating systems or open source Portable Operating System Interface type operating systems that employ a kernel. The code included in block 501 typically includes at least some of the computer code involved in performing the disclosed methods.

Peripheral device set 513 includes the set of peripheral devices of hashing mechanism 101. Data communication connections between the peripheral devices and the other components of hashing mechanism 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where hashing mechanism 101 is required to have a large amount of storage (for example, where hashing mechanism 101 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows hashing mechanism 101 to communicate with other computers through WAN 524. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the disclosed methods can typically be downloaded to hashing mechanism 101 from an external computer or external storage device through a network adapter card or network interface included in network module 517.

WAN 524 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates hashing mechanism 101), and may take any of the forms discussed above in connection with hashing mechanism 101. EUD 502 typically receives helpful and useful data from the operations of hashing mechanism 101. For example, in a hypothetical case where hashing mechanism 101 is designed to provide a recommendation to an end user, this recommendation would typically be communicated from network module 517 of hashing mechanism 101 through WAN 524 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to hashing mechanism 101. Remote server 503 may be controlled and used by the same entity that operates hashing mechanism 101. Remote server 503 represents the machine(s) that collect and store helpful and useful data for use by other computers, such as hashing mechanism 101. For example, in a hypothetical case where hashing mechanism 101 is designed and programmed to provide a recommendation based on historical data, then this historical data may be provided to hashing mechanism 101 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520. The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 524.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 504, except that the computing resources are only available for use by a single enterprise. While private cloud 505 is depicted as being in communication with WAN 524 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIGS. 2-4 to minimize hash collisions involving composite keys. In one embodiment, such components may be implemented in hardware. The functions discussed above performed by such components are not generic computer functions. As a result, hashing mechanism 101 is a particular machine that is the result of implementing specific, non-generic computer functions.

In one embodiment, the functionality of such software components of hashing mechanism 101, including the functionality for minimizing hash collisions involving composite keys, may be embodied in an application specific integrated circuit.

As stated above, hash functions and their associated hash tables are used in data storage and retrieval applications to access data in a small and nearly constant time (executed in an amount of time independent of the input size) per retrieval. A hash function takes a key as an input, which is associated with a datum or record, and used to identify the datum or record to the data storage and retrieval application. The keys may be fixed length, such as an integer, or variable length, such as a name. The keys may also be what is referred to as "composite keys," which include two or more attributes (e.g., independent fields of a tuple) that together uniquely identify an entity occurrence. As discussed above, the output of the hash function is a hash value used to index a hash table (data structure that implements an associative array or dictionary that maps keys to values) holding the data or records or pointers to them. Such a hash value may correspond to the memory address or memory location where the data or record is stored in the hash table. For example, a composite key may correspond to a user datagram protocol (UDP)/transmission control protocol (TCP) tuple comprised of 5 fields that is hashed by a hash function to generate a hash value that is used to uniquely identify a value, such as an identification of a UDP/TCP session, in a hash table. Unfortunately, hash collisions may occur when hashing from a wide domain of lookup keys, such as composite keys, to a small range (set of memory addresses) which can result in many keys generating the same hash value which identifies the same location in the hash table. A hash collision is when two pieces of data (e.g., different UDP/TCP sessions) generate the same hash value under a given hash function. When a hash collision occurs, it is handled using various techniques, such as hashing the key using another hash function, using multiple entries per locations of the hash table, maintaining a linked-list of keys hashing to the same value, etc. These techniques, however, result in increased lookup times. Unfortunately, there is not currently a means for effectively minimizing hash collisions of composite keys.

Figure 6:
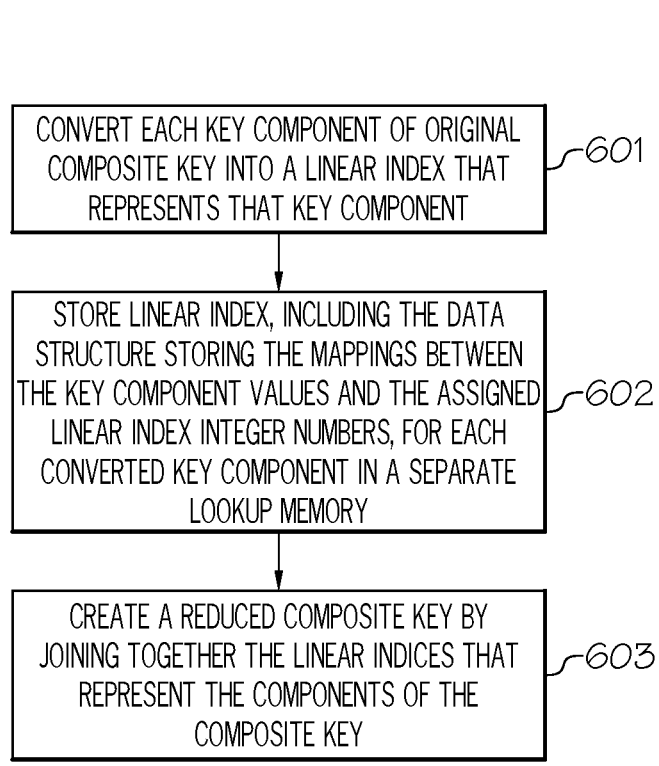
FIG. 6 is a flowchart of a method for minimizing hash collisions of composite keys in accordance with an embodiment of the present disclosure.
Figure 7:
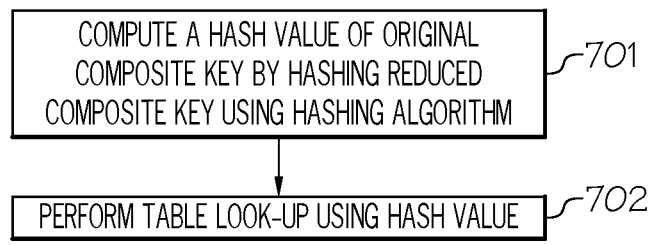
FIG. 7 is a flowchart of a method for performing a table look-up using the reduced composite key in accordance with an embodiment of the present disclosure.
Figure 8:
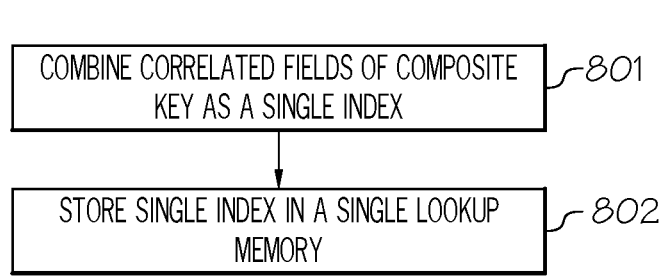
FIG. 8 is a flowchart of a method for combining multiple fields of the composite key to be represented as a single index thereby further reducing the length of the composite key in accordance with an embodiment of the present disclosure.

The embodiments of the present disclosure provide a means for minimizing hash collisions of composite keys in an effective manner as discussed below in connection with FIGS. 6-8. FIG. 6 is a flowchart of a method for minimizing hash collisions of composite keys. FIG. 7 is a flowchart of a method for performing a table look-up using the reduced composite key. FIG. 8 is a flowchart of a method for combining multiple fields of the composite key to be represented as a single index thereby further reducing the length of the composite key.

As stated above, FIG. 6 is a flowchart of a method 600 for minimizing hash collisions of composite keys in accordance with an embodiment of the present disclosure.

Referring to FIG. 6, in conjunction with FIGS. 1-5, in operation 601, conversion engine 201 of hashing mechanism 101 converts each component ("key component") of a composite key 102 into a linear index 103 that uniquely represents that key component.

As discussed above, in one embodiment, each key component represents an attribute (e.g., independent field of a tuple) of the composite key. In one embodiment, linear index 103 corresponds to an n-bit integer value, where "n" is different for the different components of the composite key based on the number of unique values that component can represent. For example, if the key component corresponds to the attribute of an IP address, then such IP addresses would be mapped to a set of linear indices of a certain width. For instance, the IP address of 9.2.2.8 would be mapped to 1, the IP address of 9.4.5.6 would be mapped to 2 and so forth. In one embodiment, such mappings (key component to linear index mappings) are stored in a data structure (e.g., table 108). The width of the linear index represents the range of values for the attribute represented by the associated key component. For example, if the key component has the attribute of an IP address, and there are only 6 possible values for the IP address, then the width of linear index 103 is 3 bits. In one embodiment, the range of values for such an attribute may be determined by conversion engine 201 by identifying the number of possible unique values for such an attribute. In one embodiment, such a range of values may be obtained by conversion engine 201 from the domain knowledge, such as via the description of the session. In another embodiment, the range of values may be provided by the domain or workload expert. As a result, the width of linear index 103 corresponds to the number of bits required to store the number of unique values (obtained from the domain knowledge) for that key component (e.g., field of composite key 102) which is smaller than the field size of the component of composite key 102. As a result, the length (i.e., range of values the component of composite key 102 represents) of the key component of composite key 102 is reduced without introducing any collisions thereby effectively resulting in a lossless compression of the individual key components.

In operation 602, conversion engine 201 of hashing mechanism 101 stores linear index 103, including the data structure (e.g., table 108) storing the mappings between the key component values and the assigned linear index integer numbers, for each converted key component in a separate lookup memory 105 (e.g., constant-time lookup memory).

As stated above, in one embodiment, lookup memory 105 is a constant-time lookup memory, where "constant-time," as used herein, refers to executing the lookup operation in an amount of time independent of the input size. In one embodiment, lookup memory 105 is a content addressable memory.

An example of the sizes of different components of composite key 102 and the size in bits of the corresponding linear index 103 is provided in FIG. 3.

As shown in FIG. 3, composite key 102 consists of 7 key components, where each key component corresponds to a field of a 7-tuple. A "tuple," as used herein, is a finite ordered list of elements.

For example, such fields (shown in column 301 identified by "key fields") include the source Internet Protocol (IP) address ("SRC IP"), the destination IP address ("DEST IP"), the source Media Access Control (MAC) address ("SRC MAC"), the destination MAC address ("DEST MAC"), the source port ("SRC PORT"), which is the TCP or UDP number used by a program to send data to another program on one end, the destination port ("DEST PORT"), which is the TCP or UDP number used by a program on one side of the communication to receive data from another program on the other end, and the protocol ("PROT").

The size of each field (shown in column 301) of composite key 102 is shown in column 302 of table 300. As shown in FIG. 3, the total length or size of all the fields (shown in column 301) of composite key 102 corresponds to 26 bytes as shown in column 302.

The number of unique values for each of these fields (shown in column 301) in the original composite key 102 is shown in column 303 of table 300. In one embodiment, such values are obtained by conversion engine 201 based on domain knowledge, such as via the description of the session. In another embodiment, the range of values may be provided by the domain or workload expert.

With respect to the SRC PORT and DEST PORT fields, such unique values may be paired with the Internet Protocol (IP) (illustrated by the phrase "Paired with IP?").

As discussed above, conversion engine 201 converts each component ("key component") of composite key 102 into a linear index 103 that uniquely represents that key component. For example, conversion engine 201 converts each key component (i.e., each field) of composite key 102 into linear index 103. Table 300 includes a column 304 for indicating the width of each of these linear indices 103 (i.e., the range of values the key component represents for that field) in terms of the number of bits. For example, as shown in table 300, the number of bits corresponding to the width of linear index 103 representing the key field of SRC IP is 12 bits since there are 4,000 unique values for that field. It is noted that for SRC PORT and DEST PORT, the number of bits may be 0 or 12/14, respectively, depending on whether or not the number of unique values is paired with the IP. As shown in FIG. 3, the width of such linear indices 103 for all the key components of composite key 102 is 53 bits if the number of bits of SRC PORT and DEST PORT is 0 and 79 bits if the number of bits of SRC PORT and DEST PORT are 12 and 14, respectively. Hence, the scheme of the present disclosure reduces the length of the 7-tuple composite key 102 from 26 bytes to 10 bytes (80 bits). In this example, such a reduction can be achieved using a few hundred kilobytes (KB) of memory resources (e.g., lookup memories 105, such as content addressable memories) as discussed below. By reducing the length of composite key 102, hash collisions are reduced. Furthermore, by reducing the length of composite key 102, fewer computational resources are needed for hashing. Hence, the scheme of the present disclosure enables the trade-off between the use of slightly more memory resources in exchange for obtaining a reduction in hash collisions and a reduction in the computational time and resources for computing the hash value.

Referring again to FIG. 3, table 300 includes a column 305 indicating the amount of memory resources utilized by lookup memories 105, such as content addressable memories (CAMs), to store such indices 103 and component-to-linear index mapping tables 108. In particular, column 305 indicates the memory size of lookup memory 105 (e.g., CAM) storing linear index 103 and table 108 for each converted key component (i.e., for each field of the original composite key). As shown in FIG. 3, the total amount of memory resources utilized by lookup memories 105 to store such linear indices 103 and tables 108 is 228 KB.

In operation 603, composite key creation engine 202 of hashing mechanism 101 creates a reduced composite key 106 by joining together the linear indices 103 that represent the components of the composite key thereby reducing the total length or domain (i.e., range of values the composite key represents) of the original composite key in a lossless manner.

As discussed above, in one embodiment, such linear indices 103 (smaller than the field size of the components of the composite key) are joined to form reduced composite key 106 by concatenating linear indices 103.

Once reduced composite key 106 is generated, it may be hashed to a final hash value using standard hashing techniques as discussed below in connection with FIG. 7.

FIG. 7 is a flowchart of a method 700 for performing a table look-up using the reduced composite key (e.g., reduced composite key 106) in accordance with an embodiment of the present disclosure.

Referring to FIG. 7, in conjunction with FIGS. 1-6, in operation 701, hashing engine 203 of hashing mechanism 101 computes a hash value of the original composite key (e.g., composite key 102) by hashing reduced composite key 106 using a hashing algorithm.

As discussed above, in one embodiment, hashing engine 203 utilizes standard hashing techniques, such as Secure Hash Algorithm 2 (SHA-2) or MD5, to hash reduced composite key 106.

In operation 702, upon computing the hash value, hashing engine 203 of hashing mechanism 101 performs a table look-up of hash table 104 using the hash value.

Furthermore, as previously discussed, by converting each component ("key component") of composite key 102 into a linear index 103 that uniquely represents that key component, there is a lossless reduction in the size of the composite key since the width of such a linear index corresponds to the number of bits required to store the number of unique values (obtained from the domain knowledge) for that key component (e.g., field of the composite key) which is smaller than the field size of the component of the composite key. As a result, the length (i.e., range of values the component of the composite key represents) of the key component of the composite key is reduced without introducing any collisions thereby effectively resulting in a lossless compression of the individual key components. Due to the fact that the individual components of composite key 102 are sparsely populated (i.e., the range of values represented by such components is much smaller than what can be represented by the composite key), each component (key component) can be represented by a small index 103, which when taken in combination, results in a reduction in the length of composite key 102 prior to hashing. Further compression of the length of composite key 102 may be obtained as discussed below in connection with FIG. 8.

FIG. 8 is a flowchart of a method 800 for combining multiple fields of composite key 102 to be represented as a single index thereby further reducing the length of composite key 102 in accordance with an embodiment of the present disclosure.

Referring to FIG. 8, in conjunction with FIGS. 1-7, in operation 801, control layer 204 of hashing mechanism 101 combines the correlated components or fields (the key fields as shown in column 301) of composite key 102 as a single index.

In operation 802, control layer 204 of hashing mechanism 101 stores the single index in a single lookup memory 105 as shown in FIG. 4.

As discussed above, referring to FIG. 4, in conjunction with FIG. 3, fields (see column 301) of the 7-tuple composite key 102, such as SRC IP and SRC MAC, are correlated (i.e., have a mutual connection). In one embodiment, such fields may be deemed to be correlated by control layer 204 based on the domain knowledge, such as via the description of the session. In another embodiment, such fields may be identified to be correlated by the domain experts. As a result, such fields of the 7-tuple composite key 102 may be combined and represented as a single index. For instance, as shown in FIG. 4, such fields are combined as shown in column 301 (SRC (MAC, IP) pair), where the field size would be 10 bytes in the composite key (see column 302) but is combined to be represented as a single index with an index width of 12 bits (see column 304) since there are 4,000 unique values for that combined field to further reduce the length of composite key 102. Such a combination is illustrated in table 400 by the removal of the row involving the field SRC MAC.

Similarly, as shown in FIG. 4, fields DEST MAC and DEST IP are combined as shown in column 301 (DEST (MAC, IP) pair), where the size would be 10 bytes in the composite key (see column 302) but is combined to be represented as a single index with an index width of 14 bits (see column 304) since there are 10,000 unique values for that combined field to further reduce the length of composite key 102. Such a combination is illustrated in table 400 by the removal of the row involving field DEST MAC.

In one embodiment, control layer 204 combines such fields in a pairwise manner. In this manner, the number of unique values remains the same as shown in column 303 of FIGS. 3 and 4 as well as enables the index width to remain the same as shown in column 304 of FIGS. 3 and 4.

As a result of combining the SRC IP and SRC MAC fields, the memory size or the amount of memory resources utilized by lookup memories 105, such as content addressable memories (CAMs), to store such an index 103 and associated table 108 (component-to-linear index mapping table) is increased as shown in column 305. For example, by combining the SRC IP and SRC MAC fields, the CAM size for storing this single linear index 103 and associated table 108 (component-to-linear index mapping table) is increased from 24 KB to 48 KB as shown in FIGS. 3 and 4. However, by removing the SRC MAC field, there is a reduction of 8 KB in the lookup memory size as shown in table 400.

Furthermore, as a result of combining the DEST IP and DEST MAC fields, the memory size or the amount of memory resources utilized by lookup memories 105, such as content addressable memories (CAMs), to store such an index 103 and associated table 108 (component-to-linear index mapping table) is increased as shown in column 305. For example, by combining the DEST IP and DEST MAC fields, the CAM size is increased from 60 KB to 120 KB as shown in FIGS. 3 and 4. However, by removing the DEST MAC field, there is a reduction of 80 KB in the lookup memory size as shown in table 400.

As a result of combining the fields discussed above, the total amount of memory resources utilized by lookup memories 105 to store such linear indices 103 and associated tables 108 is 224 KB as shown in table 400.

Furthermore, as shown in FIG. 4, by fusing multiple fields of composite key 102 into a single index, the width of linear indices 103 is 29 bits if the number of bits of SRC PORT and DEST PORT is 0 and 55 bits if the number of bits of SRC PORT and DEST PORT are 12 and 14, respectively. Hence, the scheme of the present disclosure further reduces the length of the 7-tuple composite key 102 from 26 bytes to 7 bytes (56 bits) as opposed to reducing the length of the 7-tuple composite key 102 from 26 bytes to 10 bytes (80 bits). By reducing the length of composite key 102, hash collisions are reduced. Furthermore, by reducing the length of composite key 102, fewer computational resources are needed for hashing. Hence, the scheme of the present disclosure enables the trade-off between the use of slightly more memory resources in exchange for obtaining a reduction in hash collisions and a reduction in the computational time and resources for computing the hash value.

As a result of the foregoing, embodiments of the present disclosure provide a means for minimizing hash collisions of composite keys by converting each component ("key component") of the composite key into a linear index, where the width of the linear index corresponds to the number of bits required to store the number of unique values (obtained from the domain knowledge) for that key component (e.g., field of the composite key) which is smaller than the field size of the component of the composite key. As a result, the length (i.e., range of values the component of the composite key represents) of the key component of the composite key is reduced without introducing any collisions thereby effectively resulting in a lossless compression of the individual key components. Due to the fact that the individual components of the composite key are sparsely populated (i.e., the range of values represented by such components is much smaller than what can be represented by the composite key), each component (key component) can be represented by a small index, which when taken in combination, results in a reduction in the length of the composite key prior to hashing. In this manner, by reducing the total length or domain of the composite key, hash collisions of composite keys are minimized. Furthermore, by reducing the total length or domain of the composite key, fewer computational resources are needed for hashing.

Furthermore, the principles of the present disclosure improve the technology or technical field involving hash collisions. As discussed above, hash functions and their associated hash tables are used in data storage and retrieval applications to access data in a small and nearly constant time (executed in an amount of time independent of the input size) per retrieval. A hash function takes a key as an input, which is associated with a datum or record, and used to identify the datum or record to the data storage and retrieval application. The keys may be fixed length, such as an integer, or variable length, such as a name. The keys may also be what is referred to as "composite keys," which include two or more attributes (e.g., independent fields of a tuple) that together uniquely identify an entity occurrence. As discussed above, the output of the hash function is a hash value used to index a hash table (data structure that implements an associative array or dictionary that maps keys to values) holding the data or records or pointers to them. Such a hash value may correspond to the memory address or memory location where the data or record is stored in the hash table. For example, a composite key may correspond to a user datagram protocol (UDP)/transmission control protocol (TCP) tuple comprised of 5 fields that is hashed by a hash function to generate a hash value that is used to uniquely identify a value, such as an identification of a UDP/TCP session, in a hash table. Unfortunately, hash collisions may occur when hashing from a wide domain of lookup keys, such as composite keys, to a small range (set of memory addresses) which can result in many keys generating the same hash value which identifies the same location in the hash table. A hash collision is when two pieces of data (e.g., different UDP/TCP sessions) generate the same hash value under a given hash function. When a hash collision occurs, it is handled using various techniques, such as hashing the key using another hash function, using multiple entries per locations of the hash table, maintaining a linked-list of keys hashing to the same value, etc. These techniques, however, result in increased lookup times. Unfortunately, there is not currently a means for effectively minimizing hash collisions of composite keys.

Embodiments of the present disclosure improve such technology by converting each component ("key component") of the composite key into a linear index that uniquely represents that key component. A "composite key," as used herein, is a key that includes two or more attributes (e.g., independent fields of a tuple) that together uniquely identify an entity occurrence. A "linear index," as used herein, corresponds to an n-bit integer value, where "n" is different for the different components of the composite key based on the number of unique values that component can represent. For example, if the key component corresponds to the attribute of an IP address, then such IP addresses would be mapped to a set of linear indices of a certain width. For instance, the IP address of 9.2.2.8 would be mapped to 1, the IP address of 9.4.5.6 would be mapped to 2 and so forth. In one embodiment, such mappings (key component to linear index mappings) are stored in a data structure, such as a table. The width of the linear index represents the range of values for the attribute represented by the associated key component. That is, the width of the linear index corresponds to the number of bits required to store the number of unique values (obtained from the domain knowledge) for that key component (e.g., field of the composite key) which is smaller than the field size of the component of the composite key. As a result, the length (i.e., range of values the component of the composite key represents) of the key component of the composite key is reduced without introducing any collisions thereby effectively resulting in a lossless compression of the individual key components. In one embodiment, the linear index, including the data structure (e.g., table) storing the mappings between the key component values and the assigned linear index integer values, are stored in a separate lookup memory (e.g., constant-time lookup memory). A reduced composite key is then created by joining together the linear indices that represent the components of the composite key thereby reducing the total length or domain (i.e., range of values the composite key represents) of the original composite key in a lossless manner. In this manner, by reducing the total length or domain of the composite key, hash collisions of composite keys are minimized. Furthermore, in this manner, there is an improvement in the technical field involving hash collisions.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for minimizing hash collisions of composite keys, the method comprising:
    converting each key component of a composite key into a linear index that represents the key component by mapping key components of the composite key to a set of linear indices of a certain width, wherein the linear index corresponds to an n-bit integer value, wherein a value of the n is different for different components of the composite key based on a number of unique values that component of the composite key can represent, wherein a width of the linear index corresponds to a number of bits required to store a number of unique values which is smaller than a field size of a component of the composite key, wherein the composite key comprises two or more attributes that together uniquely identify an entity occurrence;
    storing the linear index for each converted key component in a separate lookup memory; and
    creating a reduced composite key by joining together the linear index for each converted key component thereby reducing hash collisions and utilizing fewer computational resources for hashing.

2. The method as recited in claim 1 further comprising:
    computing a hash value of the composite key by hashing the reduced composite key using a hashing algorithm.

3. The method as recited in claim 2 further comprising:
    performing a table look-up using the hash value.

4. The method as recited in claim 1, wherein the attributes comprise independent fields of a tuple, wherein each key component of the composite key comprises an independent field of the tuple.

5. The method as recited in claim 4 further comprising:
    combining two or more correlated fields of the tuple as a single index; and
    storing the single index in a single lookup memory.

6. The method as recited in claim 1, wherein the lookup memory is a content addressable memory.

7. The method as recited in claim 1, wherein the lookup memory is a constant-time lookup memory.

8. A computer program product for minimizing hash collisions of composite keys, the computer program product comprising one or more computer readable storage mediums having program code embodied therewith, the program code comprising programming instructions for:
    converting each key component of a composite key into a linear index that represents the key component by mapping key components of the composite key to a set of linear indices of a certain width, wherein the linear index corresponds to an n-bit integer value, wherein a value of the n is different for different components of the composite key based on a number of unique values that component of the composite key can represent, wherein a width of the linear index corresponds to a number of bits required to store a number of unique values which is smaller than a field size of a component of the composite key, wherein the composite key comprises two or more attributes that together uniquely identify an entity occurrence;
    storing the linear index for each converted key component in a separate lookup memory; and
    creating a reduced composite key by joining together the linear index for each converted key component thereby reducing hash collisions and utilizing fewer computational resources for hashing.

9. The computer program product as recited in claim 8, wherein the program code further comprises the programming instructions for:
    computing a hash value of the composite key by hashing the reduced composite key using a hashing algorithm.

10. The computer program product as recited in claim 9, wherein the program code further comprises the programming instructions for:
    performing a table look-up using the hash value.

11. The computer program product as recited in claim 8, wherein the attributes comprise independent fields of a tuple, wherein each key component of the composite key comprises an independent field of the tuple.

12. The computer program product as recited in claim 11, wherein the program code further comprises the programming instructions for:
    combining two or more independent fields of the tuple as a single index; and
    storing the single index in a single lookup memory.

13. The computer program product as recited in claim 8, wherein the lookup memory is a content addressable memory.

14. The computer program product as recited in claim 8, wherein the lookup memory is a constant-time lookup memory.

15. A system, comprising:
    a memory for storing a computer program for minimizing hash collisions of composite keys; and
    a processor connected to the memory, wherein the processor is configured to execute program instructions of the computer program comprising:
        converting each key component of a composite key into a linear index that represents the key component by mapping key components of the composite key to a set of linear indices of a certain width, wherein the linear index corresponds to an n-bit integer value, wherein a value of the n is different for different components of the composite key based on a number of unique values that component of the composite key can represent, wherein a width of the linear index corresponds to a number of bits required to store a number of unique values which is smaller than a field size of a component of the composite key, wherein the composite key comprises two or more attributes that together uniquely identify an entity occurrence;

storing the linear index for each converted key component in a separate lookup memory; and creating a reduced composite key by joining together the linear index for each converted key component thereby reducing hash collisions and utilizing fewer computational resources for hashing.

16. The system as recited in claim 15, wherein the program instructions of the computer program further comprise:

computing a hash value of the composite key by hashing the reduced composite key using a hashing algorithm.

17. The system as recited in claim 16, wherein the program instructions of the computer program further comprise:

performing a table look-up using the hash value.

18. The system as recited in claim 15, wherein the attributes comprise independent fields of a tuple, wherein each key component of the composite key comprises an independent field of the tuple.

19. The system as recited in claim 18, wherein the program instructions of the computer program further comprise:

combining two or more independent fields of the tuple as a single index; and storing the single index in a single lookup memory.

20. The system as recited in claim 15, wherein the lookup memory is a content addressable memory.

* * * * *